US008724207B1

(12) United States Patent
Andrusyak et al.

(10) Patent No.: US 8,724,207 B1
(45) Date of Patent: May 13, 2014

(54) LASER PULSE TEMPORAL, SPECTRAL AND SPATIAL SHAPING DEVICES BASED ON VOLUME DIFFRACTIVE GRATINGS WITH SPATIALLY VARIABLE PARAMETERS

(75) Inventors: Oleksiy Andrusyak, Orlando, FL (US); Almantas Galvanauskas, Ann Arbor, MI (US); Leonid B. Glebov, Orlando, FL (US); Larissa Glebova, Orlando, FL (US); Julien Lumeau, Oviedo, FL (US); Sergiy Mokhov, Orlando, FL (US); Eugeniu Rotari, Orlando, FL (US); Vadim I. Smirnov, Orlando, FL (US); Boris Ya Zeldovich, Orlando, FL (US)

(73) Assignees: University of Central Florida Research Foundation, Inc., Orlando, FL (US); Optigrate Corporation, Orlando, FL (US)

( * ) Notice: Subject to any disclaimer, the term of this patent is extended or adjusted under 35 U.S.C. 154(b) by 503 days.

(21) Appl. No.: 13/006,108

(22) Filed: Jan. 13, 2011

Related U.S. Application Data

(63) Continuation-in-part of application No. 11/261,077, filed on Oct. 28, 2005, and a continuation-in-part of application No. 10/665,339, filed on Sep. 19, 2003, now Pat. No. 7,326,500, which is a continuation-in-part of application No. 09/750,708, filed on Dec. 28, 2000, now Pat. No. 6,673,497, which is a continuation-in-part of application No. 09/648,293, filed on Aug. 24, 2000, now Pat. No. 6,586,141.

(60) Provisional application No. 61/294,566, filed on Jan. 13, 2010, provisional application No. 60/623,889, filed on Nov. 1, 2004, provisional application No. 60/174,432, filed on Jan. 4, 2000.

(51) Int. Cl.
*G02F 1/07* (2006.01)
*H01S 3/10* (2006.01)

(52) U.S. Cl.
USPC .............................. 359/264; 372/25

(58) Field of Classification Search
USPC ........................ 385/37; 372/25, 30; 359/264
See application file for complete search history.

(56) References Cited

U.S. PATENT DOCUMENTS

| 4,834,474 A | * | 5/1989 | George et al. ............... 359/8 |
| 4,928,316 A | * | 5/1990 | Heritage et al. ........... 398/199 |
| 5,078,771 A | * | 1/1992 | Wu ............................ 65/30.11 |

(Continued)

OTHER PUBLICATIONS

Weiner, et al., High-Resolution Femtosecond Pulse Shaping, Optical Society of America, 1988, pp. 1563-1572, vol. 5, No. 8.

*Primary Examiner* — David N Spector
(74) *Attorney, Agent, or Firm* — Brian S. Steinberger; Phyllis K. Wood; Law Offices of Brian S. Steinberger, P.A.

(57) ABSTRACT

Recent invention of longitudinally chirped volume Bragg gratings has dramatically changed a design of high power femtosecond lasers. Replacing of bulky pairs of conventional surface gratings with compact and robust chirped volume Bragg gratings for stretching and compression of laser pulses in chirped-pulse-amplification systems enabled decrease of size and weight of those systems by several times. The methods and devices enable substantial increase of stretching time and compression to shorter pulses, enhancement of stretched and compressed beams quality by stationary or dynamic shaping of gratings, and shaping of laser pulses in both temporal and spectral domains.

10 Claims, 16 Drawing Sheets

(56) References Cited

U.S. PATENT DOCUMENTS

| | | | |
|---|---|---|---|
| 5,499,134 A | | 3/1996 | Galvanauskas |
| 6,055,348 A | * | 4/2000 | Jin et al. .................... 385/37 |
| 6,586,141 B1 | | 7/2003 | Efimov |
| 6,673,497 B2 | | 1/2004 | Efimov |
| 7,424,185 B2 | | 9/2008 | Glebov |
| 7,444,049 B1 | | 10/2008 | Kim |

* cited by examiner

US 8,724,207 B1

LASER PULSE TEMPORAL, SPECTRAL AND SPATIAL SHAPING DEVICES BASED ON VOLUME DIFFRACTIVE GRATINGS WITH SPATIALLY VARIABLE PARAMETERS

CROSS REFERENCE TO RELATED APPLICATIONS

This application is a continuation-in-part of co-pending U.S. patent application Ser. No. 11/261,077, filed on Oct. 28, 2005, which claims the benefit of priority to U.S. Provisional Application No, 60/623,889 filed on Nov. 1, 2004, which is a continuation-in-part of U.S. application Ser. No. 10/665,339 filed on Sep. 19, 2003, now U.S. Pat. No. 7,326,500, which is a continuation-in-part of U.S. application Ser. No. 09/750,708 filed on Dec. 28, 2000, now U.S. Pat. No. 6,673,497, which is a continuation in part of U.S. application Ser. No. 09/648,293 filed on Aug. 24, 2000, now U.S. Pat. No. 6,586,141, which claims the benefit of priority to U.S. Provisional Application No. 60/174,432 filed on Jan. 4, 2000, and claims the benefit of priority to U.S. Provisional Application No. 61/294,566 filed on Jan. 13, 2010. The entire disclosure of each of the applications listed in this paragraph are incorporated herein by specific reference thereto.

STATEMENT REGARDING FEDERALLY SPONSORED RESEARCH

This invention was made with Government support under the Department of Defense Navy, federal contract number N65538-8-M-0081 awarded by the Department of Defense Navy, and this invention was made with Government support under the Air Force Research Library(AFRL), federal contract number FA-9451-09-M-039 awarded by the Air Force Research Library(AFRL). The government has certain rights in this invention.

FIELD OF THE INVENTION

This invention relates to laser systems and, in particular, to methods and systems for laser pulse temporal, spectral and spatial shaping devices based on sectional and multipass reciprocal inclined volume Bragg gratings with spatially variable period, inclination, refractive index modulation, and average refractive index combined with phase and amplitude masks, in particular, for stretching and recompression of ultrashort laser pulses.

BACKGROUND AND PRIOR ART

High-power ultrashort laser pulses have found applications in many fields of modern science. Direct optical amplification of high-power ultrashort pulses results in detrimental nonlinear effects and laser-induced damage of amplifying medium due to extremely high peak power of amplified pulses. In order to mitigate these effects, a technique of chirped pulse amplification (CPA) was developed. Using this technique, ultrashort pulses are stretched by dispersive optical elements before amplification so that the peak power of the pulses in the amplifier is moderate and does not lead to damage. After amplification the pulses are compressed, resulting in high peak power. Pulse compression is performed with dispersive optical elements that are required to have a high laser-induced damage threshold. Traditionally, pulse stretching and compression in chirped pulse amplification systems is performed with a pair of surface diffraction gratings. Conventional technology uses metal-coated gratings. However, a problem with the prior art is that sizes of such stretchers and compressors are large than sizes of amplifiers and the average power of such laser systems is limited by the relatively low damage threshold of the metal-coated gratings.

A breakthrough in development of chirped pulse amplification laser systems was accomplished by the use of chirped fiber gratings which replaced pairs of surface gratings in stretchers and compressors. This approach has dramatically decreased size and increased robustness of chirped pulse amplification systems and enables their use in harsher environment. However, the maximum aperture of fiber chirped gratings does not allow achieving high power laser systems because of the laser induced damage of fibers by the compressed pulse.

The solution to eliminate the limitations caused by small apertures of fiber Bragg gratings was proposed in A. Galvanauskas, M. Fermann, "Optical pulse amplification using chirped Bragg gratings" U.S. Pat. No. 5,499,134 (1996) which is incorporated as a reference, where chirped volume Bragg gratings (or volume diffractive gratings) with dramatically larger apertures (compared to those in fiber Bragg gratings) were proposed for stretching and compression of high power laser pulses. However, no practical ways for making such gratings were described in that patent. The series of practically useful patents with the use of chirped volume Bragg gratings recorded in photo-thermo-refractive (PTR) glass that is described below.

The present invention is related to U.S. Pat. No. 6,586,141 issued on Jul. 1, 2003 to Oleg M. Efimov, Leonid B. Glebov, Larissa N. Glebova, Vadim I. Smirnov and titled "Process for production of high efficiency volume diffractive elements in photo-thermo-refractive glass" which describes a method of fabrication of high efficiency volume diffractive gratings in PTR glass and U.S. Pat. No. 6,673,497 issued on Jan. 6, 2004 to Oleg M. Efimov, Leonid B. Glebov, Vadim I. Smirnov, titled "High efficiency volume diffractive elements in photo-thermo-refractive glass" both having at least one common inventor as the present invention and assigned to the same assignee and which are incorporated herein by reference. The principle of pulse stretching and compression by high-efficiency PTR-glass volume diffractive gratings with variable periods as described in U.S. Pat. No. 7,424,185 issued on Sep. 9, 2008 to Leonid B. Glebov, Emilie Flecher, Vadim I. Smirnov, Almantas Galvanauskas, Kai-Hsiu Liao, titled "Stretching and compression of laser pulses by means of high efficiency volume diffractive gratings with variable periods in photo-thermo-refractive glass" and co-pending U.S. patent application Ser. No. 11/261,077 filed on Oct. 29, 2005 by Emilie Flecher, Leonid B. Glebov, and Vadim I. Smirnov and titled "Spectral and angular filters based on high efficiency diffractive elements with variable period in photo-thermo-refractive glass".

The first two patents '141 and '497 teach how to make high efficiency uniform PTR-glass volume Bragg gratings working in transmitting and reflecting regimes and how to use them for making different types of optical filters used in lasers and other photonic devices.

The high-efficiency PTR-glass reflecting volume Bragg gratings with spatially variable periods described in the '185 patent have been used to demonstrate stretching of ultrashort pulses of 100 and more femtoseconds in duration to 100s of picoseconds and high-efficiency re-compression to near-transform-limited pulse duration. Due to this period variation in the direction of laser beam propagation, different spectral components of a pulse incident on the grating are reflected by different parts of the grating along this direction. The optical path length differences between the different spectral components leads to a wavelength-dependent group delay. This wavelength-dependent delay forms a temporally and spatially stretched pulse with instant power that is decreased proportionally to a stretching ratio in comparison with that in the original pulse. A stretched pulse being launched to the same or similar grating in opposite direction will be recompressed to its original duration. More detailed description of the principle of pulse stretching and compression by a volume diffractive grating with variable period is given in the '185 patent. The '185 patent enabled commercial fabrication and a wide use of chirped volume Bragg gratings in high power laser systems with chirped pulse amplification.

However, there are several problems that still restrict a further increase of brightness, power and pulse energy in ultrashort laser systems with chirped pulse amplification. The first problem is a limitation of a stretching time resulting from a technologically limited thickness of chirped Bragg gratings. A solution of this problem is proposed in U.S. Pat. No. 7,444,049 issued Oct. 28, 2008 to K. Kim, L. Vaissie, R. G. Waarts, A. Stadler, M. J. Cumbo, titled "Pulse stretcher and compressor including a multi-pass Bragg grating". This invention proposed multipass propagation of laser beams in chirped volume and fiber Bragg gratings enabled by specially designed beam steering electro-optical components. The proposed approach enables a dramatic increase of stretching time. However, it results in a dramatic complication of stretching and compression devices.

The second problem is spectral phase distortions in stretched and compressed pulses resulting from deviations of stretching time from linear dependence on wavelength (nonlinear chirps) in different types of stretchers and compressors, from different linear and nonlinear dispersion functions in different components of chirped pulse amplification systems (fibers, amplifiers, phase retarders, etc.), and from technological imperfections of available stretchers and compressors (fibers, waveguides, surface gratings and volume gratings). An approach for solving this problem for compressors comprising surface gratings was proposed in A. M. Weiner, J. P. Heritage, and E. M. Kirschner, "High-resolution femtosecond pulse shaping", J. Opt. Soc. Am. B 5 (8), 1563-1572 (1988). It was demonstrated that the use of a phase mask at the focal plane of a pulse compressor composed with surface gratings separated by two lenses in 4f configuration allows temporal pulse shaping of the ultra-short pulses. However since such configurations are bulky, it is not usable outside a laboratory environment. Moreover, this approach cannot be used for compact and robust pulse stretchers and compressors based on chirped volume Bragg gratings.

The third problem is keeping a normal incidence of incident and diffracted beams in respect to planes of constant refractive index of CBGs. It is important to note that this conventional use of CBG for pulse stretching and compression essentially relies on the fact that incident and reflected beams are parallel to a grating vector of the CBG (i.e. normal to its equal-phase surfaces constituting the grating). It is obvious for anyone skilled in the art that if the reflected beam in this conventional CBG configuration forms a sufficiently large angle θ with respect to the incident beam then the reflected beam will acquire lateral walk off, thus producing an unacceptable distortion of the output beam. Assuming that incident-beam diameter is D, one can calculate that for a single-pass conventional CBG configuration this angle θ has to be smaller than the minimum angle $$\theta_{min} = a\tan\left(\frac{D}{2L}\right).$$

In other words, conventional CBG configurations requires that $\theta < \theta_{min}$. If this condition is not met the reflected beam will be unacceptably distorted.

In order to increase pulse energies from chirped pulse amplification systems by increasing stretched pulse duration beyond what is achievable with a single-pass conventional configuration, it has been proposed in U.S. Pat. No. 7,444,049 to use a multipass configuration for conventional retroreflecting CBGs. This puts even more strict limitation on the reflection angle θ. One can calculate that for N-pass conventional CBG configuration this angle θ has to be even smaller:

$$\theta < \theta_{min}^{(N)} = a\tan\left(\frac{D}{2\,LN}\right).$$

Essential practical limitation of operating at such small angles is that it becomes necessary to use large separation S between any pick-up or folding mirror and CBG. One can calculate that for $\theta < \theta^{(N)}_{min}$ one needs to have $S > L \cdot N$. In other words, the separation becomes N-times larger than the thickness L of the CBG itself. This makes such a conventional multipass CBG arrangement very large, in contradiction to the intended technological goal. In the '049 patent this was addressed by proposing complicated beam-switching arrangements, which make the conventional CBG multi-pass arrangement very complicated and difficult to implement in practice. Moreover, this requirement to keep parallel a propagating beam and a grating vector in any point of the CBG implies extremely strong requirements on optical homogeneity (average refractive index fluctuations and gradients) of the CBG.

What is needed is an ability to extend the prior art technology to the one of chirped Bragg gratings in PTR glass by providing an opportunity to perform the temporal, spatial, and spectral pulse shaping. It is important to note that all previous publications considered fiber and volume Bragg gratings operating in a retroreflecting mode. This is the simplest solution but it does not provide an opportunity for effective temporal, spatial and spectral control of processed laser pulses. The single consideration of an inclined volume Bragg grating is provided in FIG. 4 the '049 patent. However, this consideration is not correct because this inclined grating is not reciprocal and, therefore, different spectral components of a laser pulse incurs different lateral walk off (it is described above) and spatial profile of a laser pulse will be dramatically distorted.

The present invention is based on a new type of an optical element which is a multipass reciprocal inclined chirped volume Bragg grating. This invention provides a practical solution for stretching of ultrashort laser pulses to very long durations and recompression of these pulses without distortions by means of a new type of optical device which comprises one or several multipass reciprocal inclined chirped volume Bragg gratings with spatially variable parameters: period, direction of grating vector, refractive index modulation, and average refractive index combined with phase and amplitude masks.

SUMMARY OF THE INVENTION

A primary objective of the invention is to provide methods and systems to enable a substantial increase of stretching time and compression to shorter pulses along with more complex shaping of laser pulses in temporal, spectral, and spatial domains by means of dispersive devices comprising complex chirped volume Bragg gratings and reflectors combined with amplitude and phase masks.

A secondary objective of the invention is to provide methods and systems for laser pulse temporal, spectral and spatial shaping based on reciprocal multipass inclined chirped volume Bragg gratings with spatially variable parameters: period, direction of grating vector, refractive index modulation, and average refractive index combined with phase and amplitude masks and reflectors.

A third objective of the invention is to provide methods and systems for stretching of ultrashort laser pulses to very long durations common for chirped pulse amplification laser systems and recompression of these pulses by means of sectional reciprocal multipass inclined chirped volume Bragg gratings with spatially variable parameters: period, direction of grating vector, refractive index modulation, and average refractive index combined with phase and amplitude masks and mirrors.

A fourth objective of the invention is to provide methods and systems for compensation of optical and geometrical nonuniformity of chirped gratings with variable parameters by means of optimization of glass composition and hologram recording wavelength combined with controllable warping of gratings by mechanical, electrical or thermal induced stresses.

A fifth objective of the invention is to provide methods and systems for application of high power ultrashort pulsed laser of the present invention in precise micromachining.

A sixth objective of the invention is to provide methods and systems to enable essential increase of average power and pulse energy of lasers which dramatically increases the productivity of such laser systems in industrial environment. Moreover, it enables military applications of such lasers for remote sensing and for weapons. Therefore, the present invention has applications in both civilian and military markets.

A first embodiment of the present invention provides a method for shaping laser pulses that includes stretching a laser pulse by launching the laser pulse into a chirped Bragg grating at nonzero angle with respect to the grating vector, reflecting different spectral components of the laser pulse from different areas of a chirped Bragg grating to produce a temporal delay and lateral shift between the different spectral components to produce a stretched pulse, and can also include retroreflecting of the reflected spectral components by a reflecting surface, reflecting the retro-reflected spectral components by the same chirped Bragg grating to add a second temporal delay between the spectral components and compensating for the lateral shift, wherein the retro-reflected stretched pulse is counter-propagating with respect to the incident laser pulse to function as a reciprocal device. The stretched laser pulse can be compressed by launching the stretched laser pulse into the chirped Bragg grating from an opposite direction.

The method can also include using a second mirror to provide a multipass diffraction of the spectral components of the laser pulse before retroreflecting the multipassed spectral components to increase the delay time between the spectral components, each reflection laterally shifting the spectral components for stretching or decrease of the delay time between spectral components for compression. Alternatively, a prisms or third mirror can be used for compensation of the lateral shift to provide reciprocity of a diffracted beam without retroreflection or a monolithic mirror can be deposited on the chirped Bragg grating as a reciprocal multipass inclined chirped Bragg grating for stretching and/or compressing of the laser pulse. Spectral shaping and a temporal shaping of the laser pulse can be added by positioning an amplitude mask or a phase mask in a path of a lateral shifted spectral component to provide the corresponding spectral shaping or temporal shaping for stretching and or compressing.

To compensate for grating vector fluctuations, a localized pressure can be applied to the grating and gradients of average refractive index and refractive index modulation across an aperture of the chirped Bragg grating can be approximately eliminated by decreasing of absorption coefficient at a recording wavelength resulted from changing a concentration of cerium in the PTR glass, by changing a wavelength of a recording laser to an area of lower absorption within the area of its photosensitivity or changing a wavelength of a recording laser to an area of lower absorption within the area of its photosensitivity.

A second embodiment provides a method of shaping laser pulses including stretching the laser pulse by providing a sectional grating with offset central wavelengths for each section, launching the laser pulse into the sectional grating at nonzero angle with respect to the grating vectors of the sections, and diffracting the laser pulse by the sectional grating to produce a series of stretched pulses in accordance with a spectrum and position of each section. Launching the stretched laser pulse in the opposite direction compresses the stretched laser pulse. Each diffracted spectral component of the laser pulse from each section of the sectional chirped Bragg grating is retroreflected by a reflecting surface, the retro-reflected spectral components is then reflected by the same section of the grating to add a second temporal delay, and the lateral shift is compensated for so that each retro-reflected pulse is counter-propagating with respect to the incident laser pulse to function as a reciprocal device. The stretched pulse can be compressed by launching the stretched pulse into the sectional grating in the opposite direction. A monolithic mirrors can be deposited on an external surface of each section of the grating as a multipass tilted grating. Diffracting the laser pulse by one or more sections of multipass tilted gratings to produce a series of stretched pulses in accordance with a spectrum and position of each section by positioning an amplitude mask in a path of a lateral shifted spectral component spectral shaping of the laser pulse is accomplished while positioning a phase mask in a path of the lateral shifted spectral component provides temporal shaping of the laser pulse. Each step is applicable to stretching and to compressing of the stretched laser pulse.

In another embodiment, grating vector fluctuations in optical components having gratings can be corrected by applying a localized pressure to the optical component using mechanical actuators to apply the localized pressure, using an electrical field to apply the localized pressure or bonding the optical component to a material with a different coefficient of thermal expansion to thermally control the application of the localized pressure. Gradients of average refractive index and refractive index modulation across an aperture of the chirped Bragg grating and along the thickness of the chirped Bragg grating in a direction of the pulse propagation can be approximately eliminated by decreasing of absorption coefficient at a recording wavelength resulted from changing a concentration of cerium in the PTR glass, changing a wavelength of a recording laser to an area of lower absorption within the area of its photosensitivity or changing a wavelength of a recording laser to an area of lower absorption within the area of its photosensitivity.

Another embodiment provides a sectional grating for a large bandwidth pulse stretching and compressing that includes two or more sections of volume diffractive gratings with a variable period, each section having a central wavelength of the grating shifted relative to the other sections stacked in series to form a sectional grating with a spectral bandwidth that is wider than a bandwidth of each of the two or more sections. The thickness of each of the two or more sections can be the same or different, the spectral bandwidth of each of the two or more sections can overlap, the two or more sections can be recorded in one single substrate, two or more adjacent sections are separated by a distance to obtain a coherent addition of two pulses when used for stretching pulses resulting in a re-compressed pulse that is shorter than each of the two added pulses.

Further objects and advantages of this invention will be apparent from the following detailed description of preferred embodiments which are illustrated schematically in the accompanying drawings.

DESCRIPTION OF THE PREFERRED EMBODIMENTS

Figure 1:
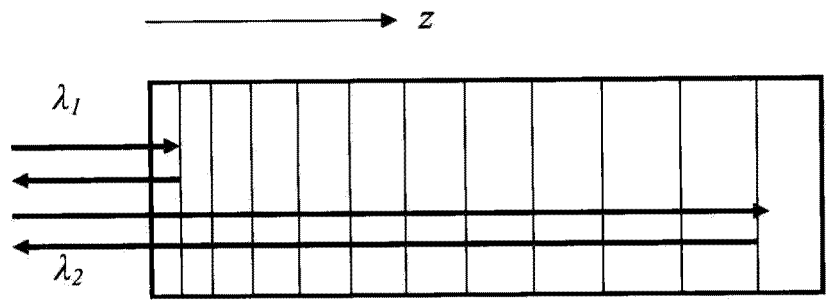
FIG. 1 shows a volume Bragg grating with variable period along the beam propagation (z-direction)—volume longitudinal chirped Bragg grating. Grating period and thickness are not in scale; thickness is usually tens of thousand times larger than the period.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The main restriction to generating high-power, high-energy, extremely short laser pulses is the appearance of non-linear processes in laser amplifiers, including laser induced breakdown. The main approach to mitigate the problem is to stretch an original pulse before final amplification and then compress it back after amplification, referred to as chirped pulse amplification (CPA).

The recent inventions of volume Bragg gratings with variable period (volume longitudinally chirped Bragg gratings in photo-thermo-refractive (PTR) glass has dramatically changed the design of high power femtosecond lasers. Replacing of bulky pairs of conventional surface gratings with compact and robust CBGs for stretching and compression of laser pulses in CPA systems enabled a decrease of size and weight of the systems by several times. However, conventional CBGs, monolithic, uniform, single-pass, and retroreflecting gratings, have some limitations determined by a maximum thickness of a single CBG, ultimate refractive index modulation and losses, such as scattering and absorption, in PTR glass along with the absence of an opportunity to provide phasing of different spectral and temporal components of laser pulses, which restrains the generation of extremely short high energy pulses with controllable temporal and/or spectral shape.

The main objective of the present invention is to enable a substantial increase of stretching time and compression to shorter pulses along with more intricate shaping of laser pulses in temporal, spectral, and spatial domains by means of complex CBGs combined with phase and amplitude masks.

The technical problems solved to achieve the goal includes 1) increasing the stretching time to decrease the power density in the amplifier, 2) increasing the spectral width of the chirped Bragg gratings to process shorter laser pulses and utilize broader gain spectra, and 3) for controlling of temporal, spectral, and spatial shapes to mitigate different types of dispersion and imperfections of components of CPA systems. To solve the first problem, it is necessary to increase length of interaction of a laser pulse with a CBG. To solve the second problem, it is necessary to increase the product of length of interaction of a laser pulse with a CBG by refractive index modulation. To solve the third problem, it is necessary to provide a phase shift between different spectral, spatial and angular components of a laser pulse. However, a considerable increase of thickness and/or bandwidth of chirped Bragg gratings in PTR glass combined with lateral and longitudinal average refractive index profiling has been beyond a conventional technology of PTR glass fabrication and chirped Bragg grating recording.

The methods and systems of the present invention include creating multipass reciprocal inclined CBGs which provide transverse separation of different spectral components of a laser pulse, creating phase and amplitude masks that provide phase retardation and attenuation of different spectral components dispersed in transverse direction, creating internal beam steering that provides deflection of different spatial components, and creating sectional CBGs that increase the effective optical path and spectral width.
Stretching/Compression Enhancement by Multipass Reciprocal Inclined Chirped Bragg Gratings:

A conventional chirped Bragg grating is shown in FIG. 1. First, consider a pulse with a spectrum which coincides/overlaps with a reflection spectrum of a chirped Bragg grating. For a pulse propagating along the Z axis, a first component ($\lambda_1$) is reflected from the front part of a chirped Bragg grating with shorter grating period, while a second component ($\lambda_2$) is reflected from the back part of CBG with longer grating period. All other spectral components between λ1 and L2 are reflected from different planes inside of this grating. A delay time between the first and second components, stretching time is $t_{st}=2Ln_{av}/c$, where L is the distance between grating areas resonant for first and second spectral components of the laser pulse grating thickness, $n_{av}$ is average refractive index of a chirped Bragg grating, and c—is speed of light. For PTR glass this stretching time is approximately $t_{st}$, (ps)= 100L, (cm).

Figure 2:
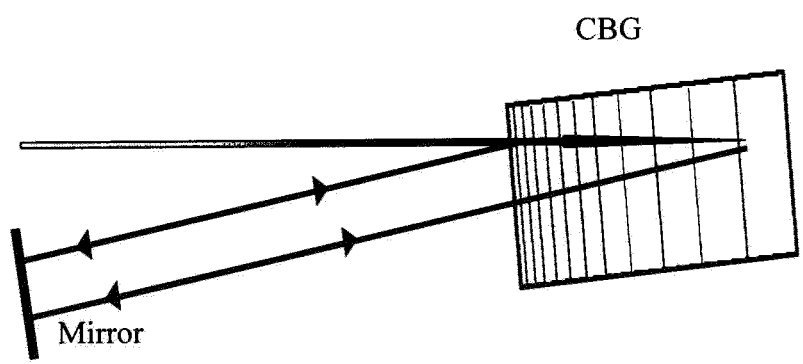
FIG. 2 shows an inclined chirped Bragg grating with an external retroreflecting mirror which provides double pass of a laser pulse.
Figure 3:
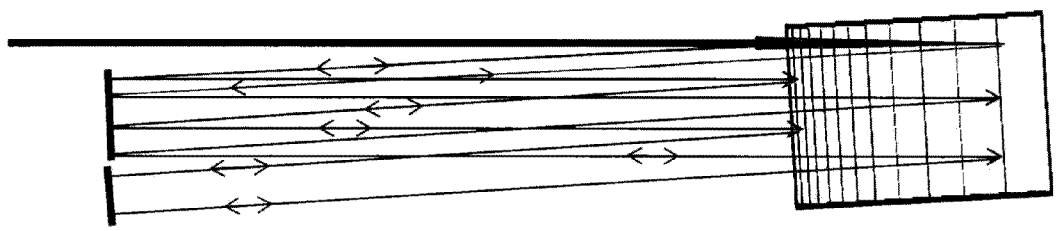
FIG. 3 shows a multipass reciprocal inclined chirped Bragg grating with a mirror, which provides multipass propagation, and a retroreflecting mirror.

In regard to increasing the stretching time, a first example provides multipass propagation of a laser pulse in a chirped Bragg grating, which is possible by changing an incident angle as shown in FIG. 2. In this example, a pulse reflected by a chirped Bragg grating does not overlap with the incident pulse in space. Different spectral components incur a lateral shift which is not desirable for the further amplification. However, it is important that all these components propagate collinearly. Use of a retroreflecting mirror that can be external as shown in FIG. 2 or deposited on a surface of a chirped Bragg grating, provides doubling of the optical path of a laser pulse in comparison with a conventional chirped Bragg grating working in a retroreflecting mode. It is important that the lateral shift is completely compensated during the third and fourth passages of the laser pulse through the chirped Bragg grating after reflection from the mirror. Therefore, an inclined two-pass volume Bragg grating with a retroreflecting mirror becomes a reciprocal device where all of the spectral components are retro-reflected.

This approach can be extended to an arbitrary number of passages to provide an optimal relationship between stretching time and losses as shown in FIG. 1A trajectory of a retroreflecting pulse after multiple passes finally overlaps with a trajectory of the incident pulse. Further separation of these pulses can be achieved by a polarizing beam splitter.

Figure 4:
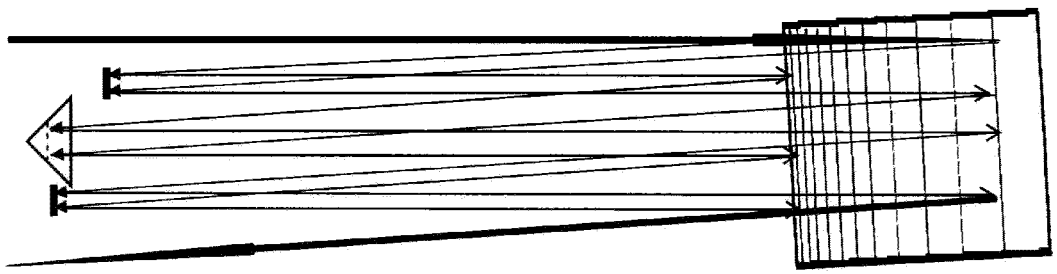
FIG. 4 shows a multipass reciprocal inclined chirped Bragg grating with no retroreflection where lateral chirp compensated by a reflecting prism.

It is important that reciprocity of inclined CBGs could be achieved without retroreflection as shown in FIG. 4. In this example, one or several reflections can be provided by a prism with total internal reflection or a pair of mirrors which compensate for a lateral shift and, therefore, enable separation of the incident and the diffracted pulses while all spectral components in the diffracted beam are completely overlapped in geometrical and angular spaces. This means that reciprocity in the diffracted beam can be achieved In this example, it is important that this device is not sensitive to polarization of a laser pulse and does not require additional devices for separation of incident and output beams.

While the optical devices have been described for stretching of laser pulses, it is clear for a person skilled in optics that these optical devices being illuminated in the opposite direction can also be used for compression of stretched pulses. Thus the multipass reciprocal inclined (MRI) CBGs are a new type of dispersive optical elements which provides dramatic increase of stretching time and a ratio of for CPA systems.

Use of MRI CBGs for pulse compression in high power CPA systems leads to a non-trivial result in that it enables a significant increase in the recompressed pulse energies compared to single-pass configuration at a cost of reduced overall compression efficiency. The maximum enhancement in the recompressed pulse energy (which, depending on a single-pass reflectance, can be by more than an order of magnitude) is achieved at a constant overall CVBG compression efficiency of approximately greater than 36%. In other words, for a properly configured MRI CBG compression efficiency should not be below 36%, but this efficiency can be higher by trading-in the compressed-energy enhancement. As a result, using this multipass configuration one can overcome fundamental physical limitations in current CPA systems associated with limited power density in amplifiers and to increase maximum extractable pulse energy by more than an order of magnitude, while trading-in the overall system efficiency.

As an example, let's consider peak-power limitations in a fiber CPA system. As it is well known (see A. Galvanauskas, Ultrashort-Pulse Fiber Amplifiers" in "Ultrafast Lasers—Technology and Applications", Marcel Dekker, Inc., New York, 2003) the main limitation on extractable pulse energy in a fiber CPA is associated with detrimental self-phase modulation (SPM) effects on the phase of amplified stretched optical pulses. It has been shown that detrimental SPM effects scale with the peak nonlinear-phase shift $\phi_{SPM}^{peak}=P_0\gamma z_{eff}$, where $P_0$ is peak power of a stretched pulse, the effective propagation distance $z_{eff}$ accounts for the gain g in a fiber amplifier, and γ is the fiber nonlinearity coefficient $\gamma=n_2\omega_0/cA_{eff}$. Here $n_2$ is the nonlinear refractive index and $A_{eff}=\pi r^2$ is the fundamental-mode area determined by the mode radius r.

Let's consider the CPA system in which compression is achieved using an N-pass inclined CBG compressor. If in a single-pass this CBG provides compression of a stretched pulse of duration Δt, then the stretched pulse for N-passes will be NΔt. Let's assume that the maximum peak power in the final amplification stage fiber (as limited by the nonlinear effects in that stage) is $P_{cr}$. Then the maximum amplified pulse energy is $$E_{amplif}=P_{cr}\cdot N\cdot\Delta t.$$

Now let's assume that the total CBG reflectance for a single "bounce" from a mirror-CVBG combination is $R=R_{mirror}R_{CVBG}$. The compressed pulse energy then is $$E_{compr}=E_{amplif}R^N.$$

Since for a conventional single-pass CBG compressor configuration maximum extractable pulse energy is $P_{cr}\Delta t$, then one can express enhancement produced by an N-pass CBG compressor configuration for the maximum amplified and the corresponding compressed pulse energies as $$\frac{E_{amplif}}{P_{cr}\Delta t} = N,$$

and $$\frac{E_{compr}}{P_{cr}\Delta t} = N \cdot R^N.$$

Figure 5:
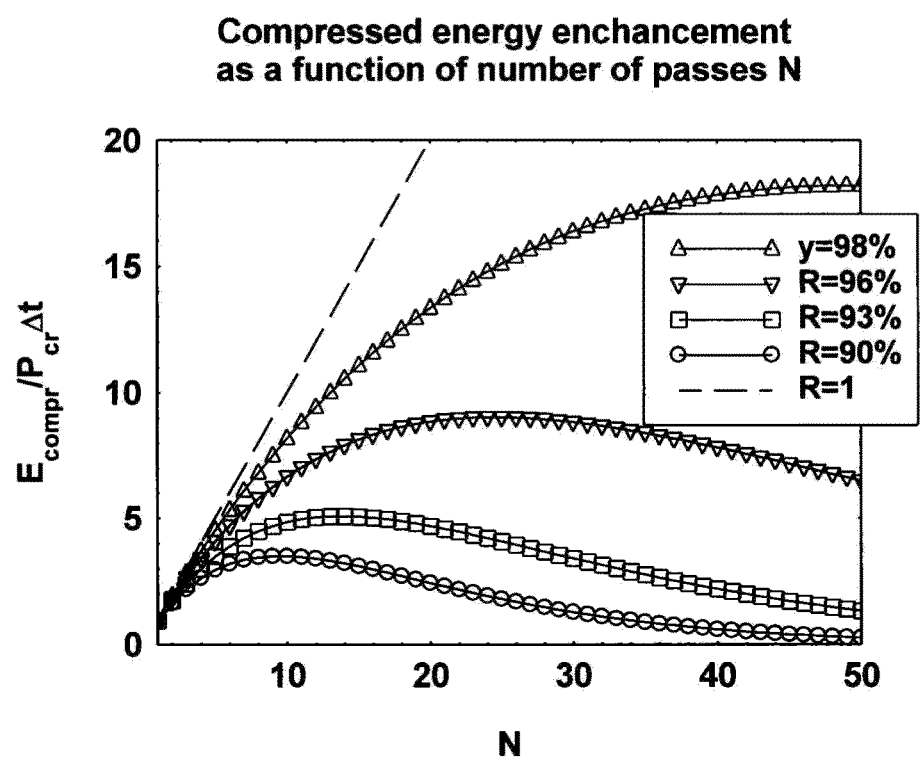
FIG. 5 shows dependence of compressed energy enhancement on a number of passes in gratings with different reflection coefficients.

A plot of the compressed-pulse energy enhancement as a function of passes N in the CVBG compressor for difference single-pass CVBG compressor reflectance R is shown in FIG. 5.

As shown, the compressed pulse energy enhancement reaches maximum at a certain number of passes for every R value. Clearly, this sets the maximum for the allowed number of passes $N_{max}$ in a CBG compressor. Simple analysis reveals that this maximum number of passes is $$N_{max} = -\frac{1}{\ln R}.$$

It is important to note that this enhancement in compressed pulse energy comes at the expense of reduced compression efficiency $\eta = E_{compr}/E_{amplif}$. What is unexpected is that the maximum compressed-pulse energy enhancement corresponds to the compression efficiency, which is independent from R. Indeed $$\eta|_{atN_{max}} = \frac{N_{max}R^{N_{max}}}{N_{max}} = R^{N_{max}} = R^{-\frac{1}{\ln R}} = e^{-1} = 0.3679.$$

This leads to the conclusion that the maximum compressed-pulse energy enhancement is equal to $$\frac{E_{compr}^{max}}{P_{cr}\Delta t} = N_{max}R^{N_{max}} = -\frac{1}{\ln R}R^{-\frac{1}{\ln R}},$$

and is always achieved at 36% compression efficiency. This is illustrated in FIG. 6, where thick line ($\eta$=36%) represents this maximum compressed-pulse energy enhancement at constant 36% compression efficiency.

Note that by sacrificing the compressed-pulse energy enhancement somewhat, the achievement is still significant (albeit somewhat reduced compared to the maximum enhancement). Indeed, it can be shown that in general, keeping fixed compression efficiency at $\eta$ one can write the compressed-pulse energy enhancement as a function of R as $$\frac{E_{compr}}{P_{cr}\Delta t} = \frac{\ln \eta}{\ln R} \cdot R^{\frac{\ln \eta}{\ln R}}.$$

Figure 6:
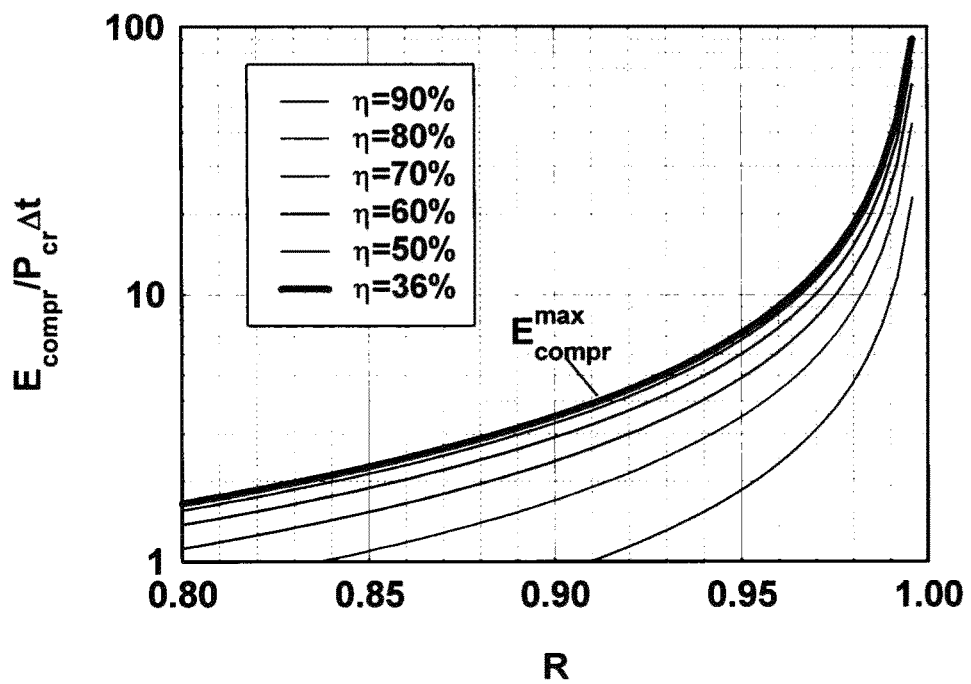
FIG. 6 is a graph showing the dependence of compressed energy enhancement on reflection coefficient of grating for different efficiency of compressing.

This is also illustrated in FIG. 6 for different efficiency $\eta$ values.

In summary, by using a MRI CBG compressor configuration one can significantly enhance compressed-pulse energies achievable with a CPA systems (by up by an order of magnitude) while sacrificing the compression efficiency quite moderately. This allows overcoming fundamental peak-power limitations in a CPA system by an order of magnitude or more.

Figure 7:
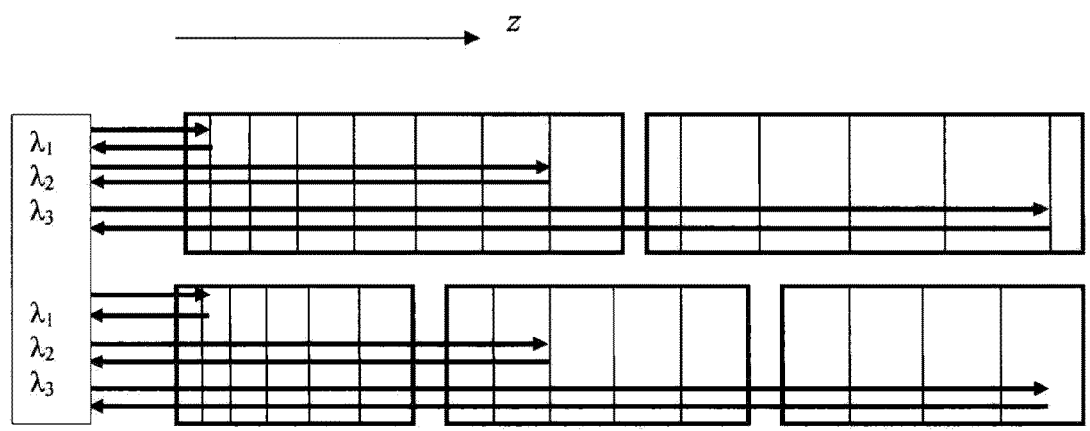
FIG. 7 shows sectional chirped Bragg gratings with offset central wavelengths. Top—chirped Bragg grating with 2 sections, bottom—chirped Bragg grating with 3 sections.

Stretching/Compression Enhancement by Sectional Chirped Volume Bragg Gratings:

While the recording of thick (greater than approximately 10 cm) volume diffractive gratings with variable periods in PTR glass is possible, the task is technologically challenging. A more advanced solution beyond the limits of MRI CBGs is the development of large-bandwidth high-efficiency pulse stretchers and compressors based on a concept of sectional CBGs. In this approach, a large optical pathstretcher/compressor includes two or more sections, instead of a monolithic CBG. Each section is a volume diffractive grating with a variable period. The central wavelength of each section of the grating is shifted relative to other sections such that when the sections are stacked in series as shown in FIG. 7, multiple gratings form a thick sectional grating with a spectral bandwidth that is wider than that of each section. The thickness, bandwidth, rate of period variation (longitudinal chirp), refractive index modulation, and other basic parameters of the sections, is used to form a thick sectional grating, may or may not be the same for each section of the stack. Similarly, the spectral bandwidths of the sections may or may not overlap and the sections of such thick gratings can be recorded in the same or different substrates.

Figure 8:
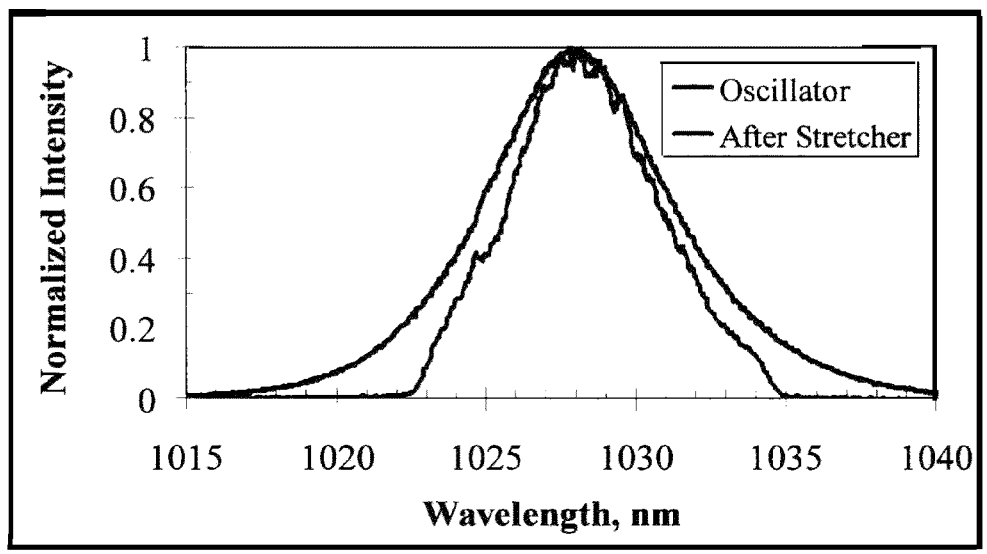
FIG. 8 is a graph showing the spectra of pulses before and after stretching by a monolithic volume diffractive grating with variable period.
Figure 9:
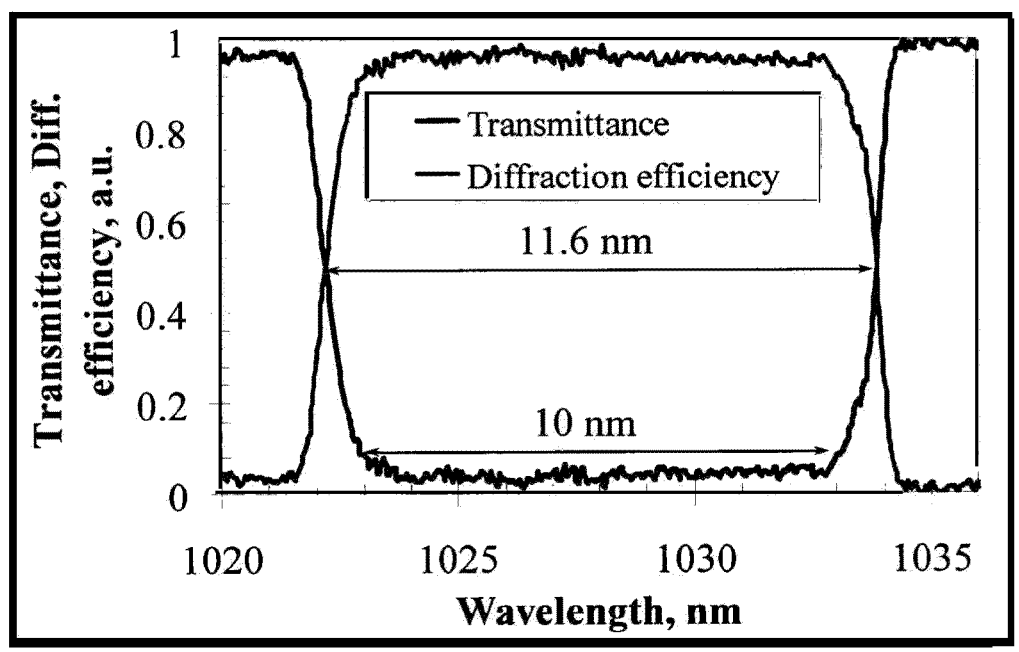
FIG. 9 shows transmittance and diffraction efficiency of a pulse-stretching volume diffractive grating with a linearly variable period.

As a proof-of-principle that sectional gratings can be used for pulse stretching and compression, the following demonstration has been performed. A femtosecond oscillator that delivers transform-limited pulses with 7 nm FWHM bandwidth centered around 1028 nm as shown in FIG. 8 and pulse duration of approximately 155 fs FWHM was used. The pulse train from the oscillator was directed onto a 32-mm thick volume diffractive grating with a linearly variable period. Referring to FIG. 9, in this example, the grating had a central wavelength of approximately 1028 nm, FWHM bandwidth of approximately 11.6 nm, and a diffraction efficiency greater than approximately 95% over an approximately 10 nm bandwidth. Pulses diffracted by the grating were stretched to approximately 160 ps (FWHM). Then the stretched pulse is recompressed by a 2-piece sectional volume diffractive grating as shown in FIG. 7 (top). Each section was a volume diffractive grating with variable period of approximately 16 mm thickness. The front section had a central wavelength of approximately 1025.6 nm, FWHM bandwidth of approximately 4.9 nm, and diffraction efficiency greater than approximately 95% over an approximately 3.8 nm bandwidth. The rear section had a central wavelength of approximately 1031.1 nm, FWHM bandwidth of approximately 5.9 nm, and diffraction efficiency greater than approximately 95% over an approximately 4.5 nm bandwidth.

When only the front section of the sectional grating was used for re-compression, pulses with a duration of approximately 800 fs were obtained. When both sections were used, diffracting the pulse in the same direction, the he spectrum of compressed pulses was a sum of spectra reflected by each section. In general, long input pulses of approximately 160 ps are frequency- and time-split between the sections and recompressed independently by each section of the sectional grating to pulses of approximately 800 fs duration. These pulses are separated in time according to mutual positions of the sections. When spacing between the sections can be adjusted such that the two output pulses are overlapped in time, the two pulses interfere. By adjusting the spacing between the sections, it is possible to obtain a coherent addition of the two pulses, resulting in a single re-compressed pulse that is significantly shorter than each of the two pulses. Using real spectra reflected by both sections of the compressor grating, the transform-limited pulse width should be approximately 350 fs. It was found that the FWHM width of the compressed pulses is approximately 370 fs (1.05× transform-limited pulse width). Thus, the demonstration proves the concept that both stretching and compression of ultrashort laser pulses can be accomplished by sectional gratings.

Figure 10:
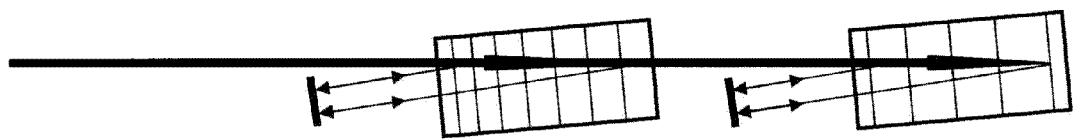
FIG. 10 shows a sectional chirped Bragg grating assembled from two multipass inclined gratings.

It is clear that sectional CBGs can be assembled from multipass tilted chirped Bragg gratings as shown in FIG. 10, for example. This approach enables a combination of benefits provided by both tilted and sectional chirped Bragg gratings.

Figure 11:
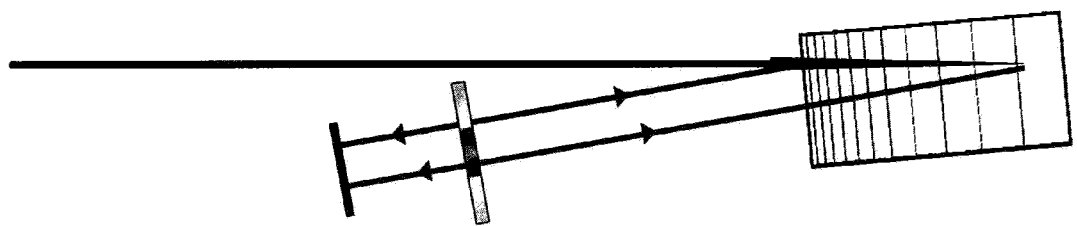
FIG. 11 shows an inclined chirped Bragg grating with a mirror at normal incidence and a mask (amplitude or phase) for temporal, spectral or spatial beam shaping or/and GVD correction.

Longitudinal Phase and Dispersion Control by MRI CBGs:

The methods and systems of the present invention are based on the feature of MRI CBGs that provide a lateral shift of different spectral components which propagate collinearly. According to the present invention, it is possible to put a mask in a collimated pulse where each spectral component would be modified independently as shown in FIG. 11. The use of an amplitude mask provides spectral shaping of pulses. The use of a phase mask provides temporal shaping of pulses. This approach can be applied to both monolithic MRI and sectioned CBGs. This method provides not only stretching and compression of laser pulses but complex shaping of pulses in temporal, spectral and spatial domains.

Figure 12A:
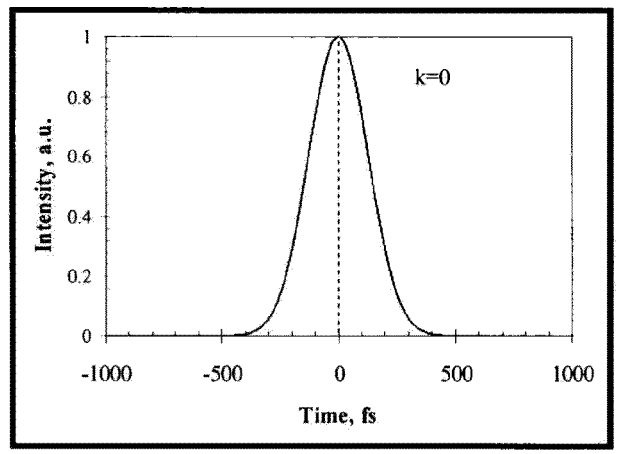
FIG. 12a shows shaping of temporal profile of a laser pulse by a binary phase mask with no phase retardation between two sections of the mask.
Figure 12B:
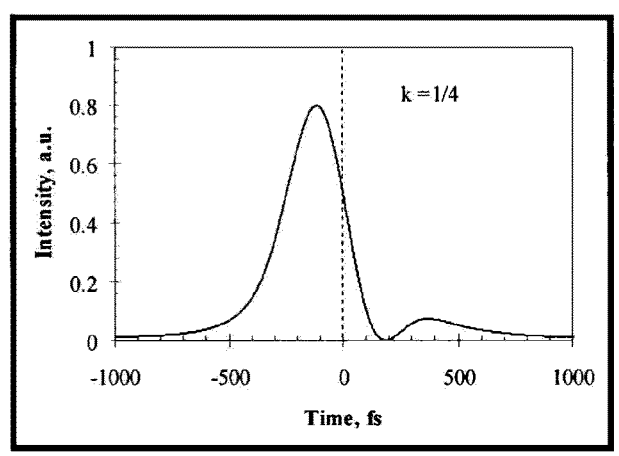
FIG. 12b shows shaping of temporal profile of a laser pulse by a binary phase mask with ¼ wavelength phase retardation between two sections of the mask.
Figure 12C:
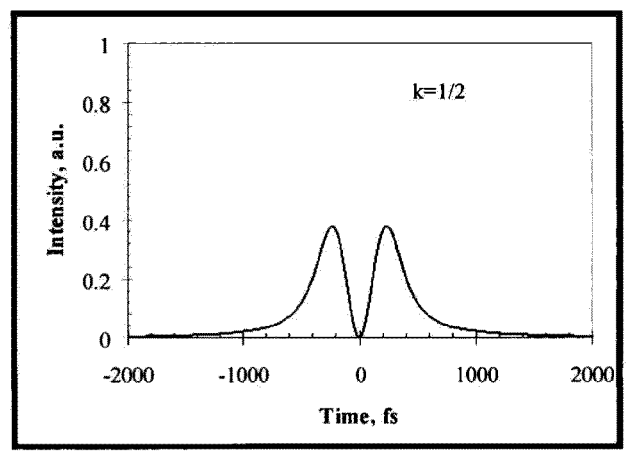
FIG. 12c shows shaping of temporal profile of a laser pulse by a binary phase mask with ½ wavelength phase retardation between two sections of the mask.

Placing amplitude and phase masks in collimated beams with linear spectral dispersion in the lateral direction provides wide opportunities for ultrashort laser pulses control. As an example, FIGS. 12a, 12b and 12c show temporal profile shaping by a simplest phase mask which is inserted in a collimated beam before the retroreflecting mirror as shown in FIG. 11, and provides a phase shift for one half of the beam. One can see that increasing of the phase shift for ¼ (FIG. 12b) or for ½ (FIG. 12c) of the wavelength causes dramatic changes in the pulse shape converting a single pulse to a pair of coherent pulses as shown in FIG. 12c. It is clear that changing the profile of such masks one can produce almost arbitrary forming of the pulse shape in the temporal domain. Similar operations in the spectral domain could be produced by amplitude masks placed in the same position that is shown in FIG. 11.

Lateral Phase and Grating Vector Control in Single- and Multipass CBGs

Stretching of a short laser pulse to 1 ns and beyond requires a CBG with a thickness of 10 cm and larger. This means that after stretching and compression, each spectral component would propagate for 20 cm inside of a CBG. It is clear that for a main part of high power applications, divergence of a laser beam should be close to the diffraction limit. Therefore, one of the challenging problems arises in CBGs with a large optical path is a precise control of the grating vector across the aperture and along the whole thickness in the direction of the laser beam propagation. There are several phenomena that determine distribution of the grating vector in the whole volume of the CBG.

Figure 13A:
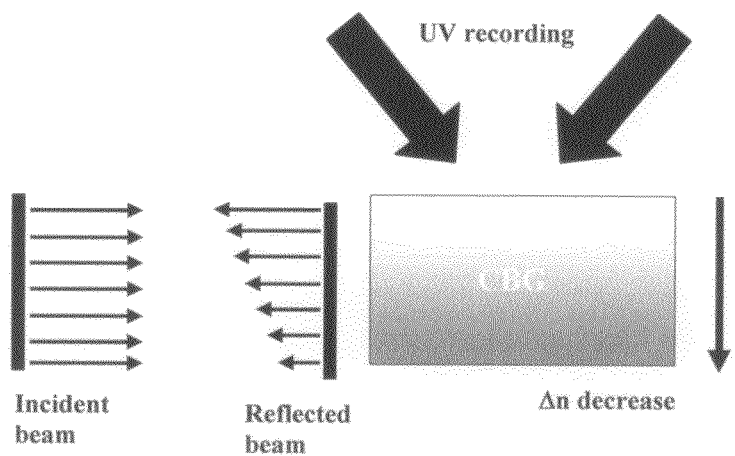
FIG. 13a shows the effect of attenuation of actinic radiation in PTR glass on gradient of diffraction efficiency resulting from a gradient refractive index modulation.

A hologram in PTR glass is recorded by exposure of a glass wafer to actinic UV radiation (FIG. 13). This radiation is partially absorbed by $Ce^{3+}$, which is the primary photosensitive agent in PTR glass triggering all photoinduced structural transformations. The final result of these processes is a refractive index change of the irradiated area which is a measure of phase photosensitivity of PTR glass. Therefore the first important effect is attenuation of actinic UV radiation by PTR glass as a function of the distance from the front surface. This effect causes a decrease of refractive index modulation and therefore a decrease of diffraction efficiency of a hologram with the increase of a distance from the front surface that corresponds to a variation of the reflection coefficient across the aperture of a CBG (FIG. 13, top). The second effect is a gradient of average refractive index in the direction of the hologram recording that corresponds to a gradient of average refractive index across the aperture of a CBG. This gradient converts a plane-parallel plate of PTR glass to a prism. This prism produces different deflections for different parts of a laser beam and for different spectral components in the MRI CBG (FIG. 13 bottom).

Figure 14:
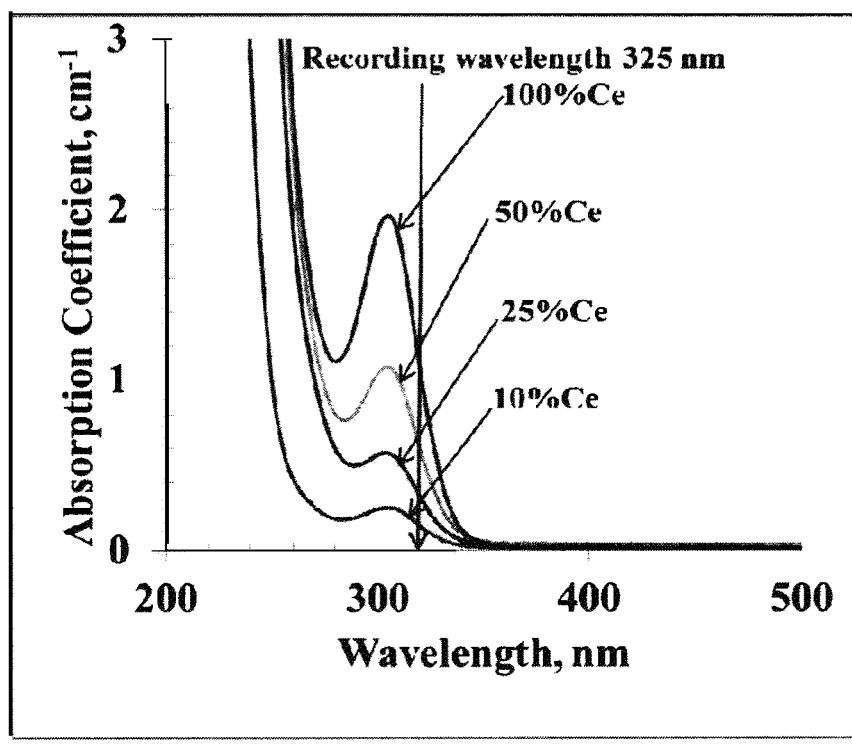
FIG. 14 shows absorption spectra of PTR glass with different concentration of cerium.
Figure 15:
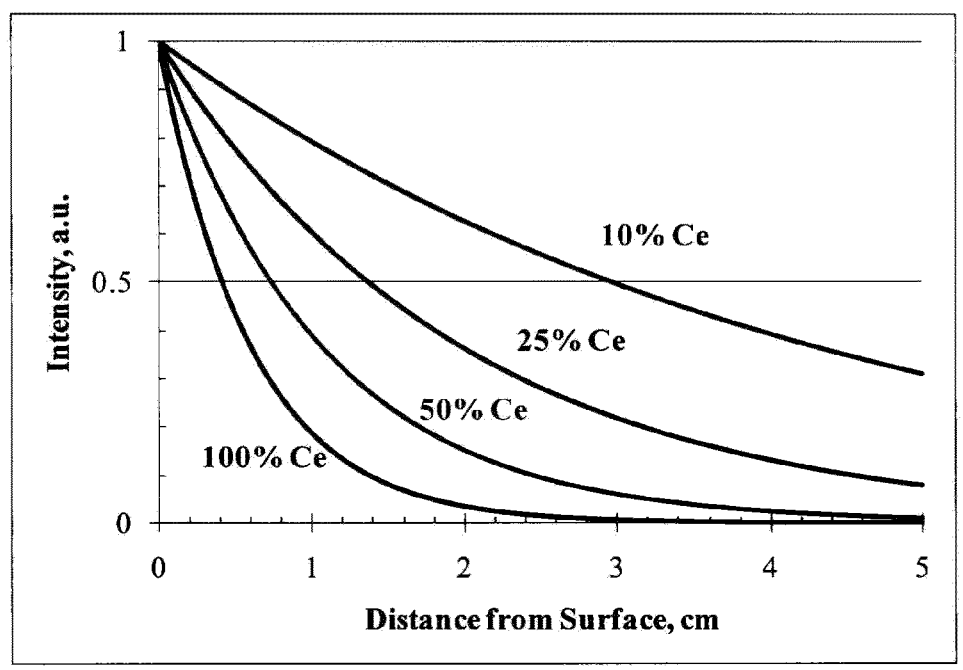
FIG. 15 shows attenuation of actinic radiation in PTR glass with different concentration of cerium.

Short wavelength absorption edge in PTR glass is determined by cerium which is introduced in PTR glass composition with concentration of 0.01 at. % (upper curve in FIG. 14). The best available wavelength for hologram recording in PTR glass is 325 nm emitted by a He—Cd laser shown by an arrow in FIG. 14. Dependence of the absorbed UV dosage at 325 nm on the distance from the front surface of a PTR glass wafer is shown in FIG. 15. One can see that an attenuation of actinic radiation by a factor of two occurs at the distance of 5 mm from the front surface. This value determines the maximum aperture of a CBG recorded in a conventional PTR glass.

Figure 16:
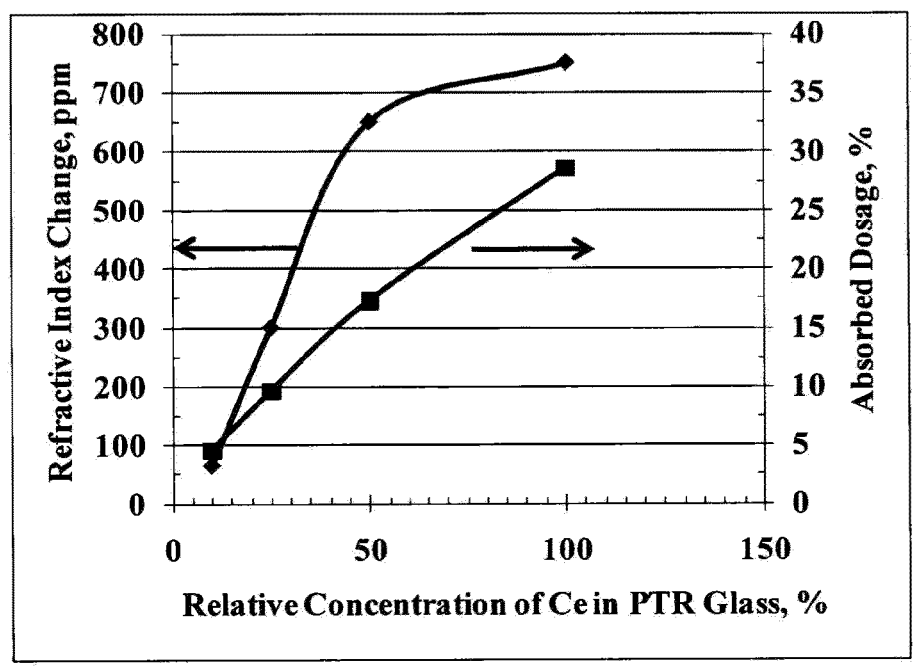
FIG. 16 shows dependence of refractive index modulation and fraction of absorbed actinic radiation on concentration of cerium.

Cerium is the main photosensitive component in PTR glass and therefore cannot be excluded from the glass composition. However, it was found that the concentration of cerium in PTR glass can be decreased by several times without a dramatic loss of photosensitivity (refractive index modulation) as shown by the graph in FIG. 16. This modification of PTR glass composition enables increasing of the aperture of CBGs up to several centimeters (FIG. 15) without deterioration of optical uniformity of such an optical element and keeping photosensitivity at the acceptable level.

The additional approach to improve optical uniformity of a thick hologram in the lateral direction is to increase the wavelength of a recording laser radiation within absorption bands of cerium. It was found that photosensitivity of PTR glass decreases with increasing of a wavelength and drops below a detectable level at approximately 350 nm as shown in FIG. 14. Therefore, development of single frequency lasers emitting in the range of 340-350 nm would enable a further decrease of attenuation of actinic radiation and increase of aperture of CBGs.

Figure 17:
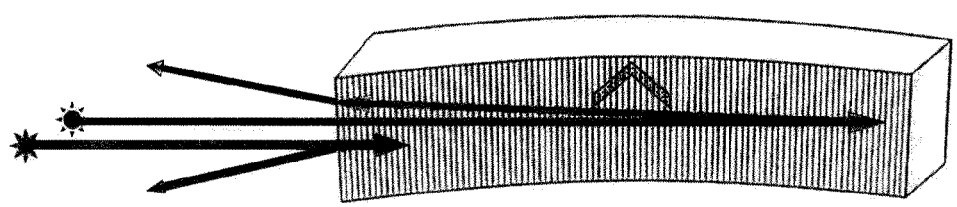
FIG. 17 shows deflection of different spectral components resulted from geometrical distortions of chirped gratings.

Another phenomenon affecting uniformity of a grating vector in the volume of thick reflecting VBG is recently discovered deformation of a glass wafer with a recorded hologram resulted from thermal development and nonuniform distribution of temperature in a CBG placed in a high power laser beam (FIG. 17). The first mechanism causes a stable deformation of a grating while the second mechanism causes reversal deformation that disappears after laser illumination is over. We propose the following methods of compensation of those distortions that could be dynamic and therefore could be used in automatic controllers working in real time scale.

Figure 18A:
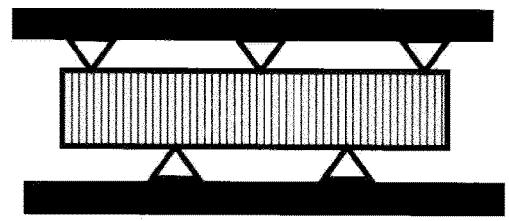
FIG. 18a shows an example for compensation of geometrical distortions of gratings by mechanical actuators.

The first method is the use of a localized mechanical pressure produced by actuators (conventional or piezo). This method is schematically shown in FIG. 18a. A distorted grating is fixed in a rigid frame with a desired number of actuators. These actuators could be screws, pins, piezo-actuators or any other devices that could provide controllable pressure to a grating.

Figure 18B:
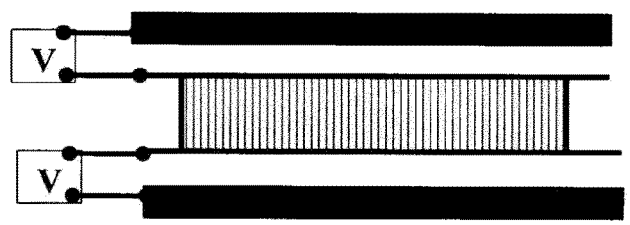
FIG. 18b shows another example for compensation of geometrical distortions of gratings by electric field.

The second method is the use of electrical field. In this case, conducting layers should be deposited to the side surfaces of a grating and this device should be placed between electrodes as shown in FIG. 18b. Applying voltage between the electrodes and conducting layers provides mechanical pressure that would deform the grating in the desirable configuration. The electrodes and conducting layers can be uniform, as shown in FIG. 18b, or can be sectioned to provide complex profile of stresses.

Figure 13B:
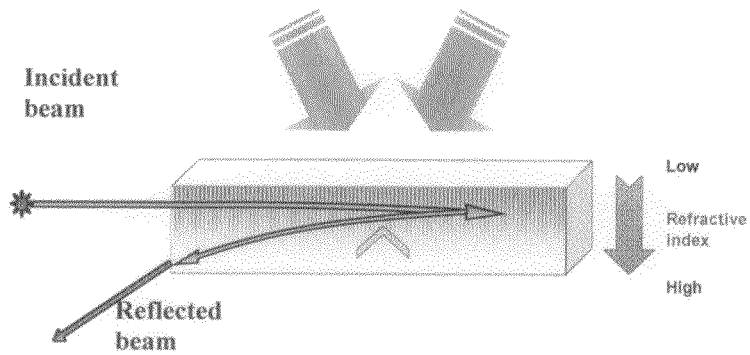
FIG. 13b shows the deflection of a diffracted beam resulted from a gradient of average refractive index.
Figure 18C:
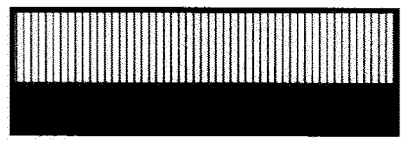
FIG. 18c shows yet another example for compensation of geometrical distortions of gratings by bonding to a material with different coefficient of thermal expansion.

The third method is to bond a grating with a material that has different coefficient of thermal expansion as shown in FIG. 18c. In this example, changing of a temperature of this subassembly would result in controllable bending. It is clear that a number of designs could be proposed to provide a controllable warping of a grating. The proposed approach with controllable warping of thick Bragg gratings including CBGs and MRI CBGs provides compensation of distortions produced by thermal development and heating by laser beams. Moreover, this approach could be used for compensation of nonuniform distribution of average refractive index as shown in FIG. 13b. In this case, a prism induced by a gradient of an average refractive index could be compensated by warping of a glass plate having a hologram recorded inside of this glass plate.

Figure 19:
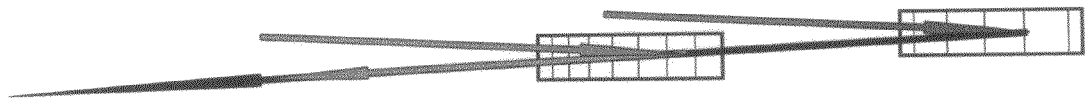
FIG. 19 shows wavelength/time division multiplexing (spectral and temporal combining) of laser pulses by sectional tilted CBG.

Wavelength/Time Division Multiplexing/Demultiplexing by MRI CBGs:

The present invention with sectional and MRI CBGs enables not only temporal and spectral shaping of individual laser pulses but can be used for spectral and temporal combining of combs of laser pulses as shown in FIG. 19. For a series of lasers emitting at different wavelengths, chirped Bragg gratings used for pulse compression can provide an additional function which is spectral combining. This device is based on the unique property of a volume chirped Bragg grating to diffract laser pulses within a certain spectral region. Pulses with different wavelengths would be transmitted by the grating. In this example, several CPA laser systems with offset wavelengths can be combined in a single aperture while a combined train of pulses would include all wavelengths and multiplexed pulse repetition rate. It is clear that launching a wide spectrum short laser pulse in the direction opposite to that in FIG. 19 would produce spectral and temporal demultiplexing that could be used for different types of interaction of short laser pulses with materials and structures.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for shaping laser pulses comprising the steps of:
stretching a laser pulse by
launching the laser pulse into a first side of a chirped Bragg grating at nonzero angle with respect to the grating vector;
reflecting different spectral components of the laser pulse from different areas of a chirped Bragg grating to produce a temporal delay and a first lateral shift between the different spectral components;
using a first mirror inclined in respect to a direction of diffraction beam propagation to provide a first multipass diffraction of the spectral component of the laser pulse from different areas of the chirped Bragg grating to increase the delay and the lateral shift between the different spectral components after each next reflection;
using one of a phase and an amplitude mask placed between the chirped Bragg grating and the inclined first mirror to provide independent shaping of the spectral components with different lateral shifts;
using a second mirror normal in respect to direction of the diffracted beam propogation to provide retroreflection of the delayed and laterally shifted spectral components; and
using the inclined first mirror to provide second multipass diffraction of the spectral components that increase the delay and decrease the lateral shift between the spectral components after each next reflection to produce a final laser pulse after the last pass having a final delay with no lateral shift between the spectral components.

2. The method of claim 1 further comprising the step of:
using a prism or fourth mirror for compensation of the lateral shift to provide reciprocity of a diffracted beam without retroreflection.

3. The method claim 1 further comprising the step of:
applying a localized pressure to the chirped Bragg grating to correct grating vector fluctuations.

4. The method of claim 1 further comprising the step of:
eliminating gradients of average refractive index and refractive index modulation across an aperture of the chirped Bragg grating by changing a wavelength of a recording laser to an area of lower absorption within the area of its photosensitivity.

5. The method of claim 1 further comprising the steps of:
compressing the stretched laser pulse by
launching the stretched laser pulse into second opposite side of the chirped Bragg grating at a same nonzero angle with respect to the grating vector;
reflecting different spectral components of the stretched laser pulse from different areas of the chirped Bragg grating to reduce the temporal delay and a second lateral shift between the different spectral components;
using a fifth mirror inclined in respect to a direction of diffraction beam propagation to provide a third multipass diffraction of the spectral component of the stretched laser pulse from different areas of the chirped Bragg grating to decrease the delay and increase the lateral shift between the different spectral components after each next reflection;
using the one of the phase and an amplitude mask placed between the chirped Bragg grating and the inclined fifth mirror to provide independent shaping of the spectral components with different lateral shifts;
using a sixth mirror normal in respect to direction of the diffracted beam propogation to provide retroreflection of the delayed and laterally shifted spectral components; and
using the inclined fifth mirror to provide fourth multipass diffraction of the spectral components that decreases the delay and decreases the lateral shift between the spectral components after each next reflection to produce a final laser pulse after the last pass having no delay with no lateral shift between the spectral components.

6. The method of claim 1 further comprising the steps of;
modifying an amount of cerium in a PTR glass to change an absorption coefficient at a recording wavelength; and
recording a chirped Bragg grating in the modified PTR glass to eliminate gradients of average refractive index and refractive index modulation across an aperture of the chirped Bragg grating.

7. The method of claim 6 further comprising the step of:
modifying a wavelength of a recording laser to an area of lower absorption within an area of photosensitivity of the modified PTR glass to eliminate gradients of average refractive index and refractive index modulation across the aperture of the modified chirped Bragg grating.

8. The method of claim 1, further comprising the step of: compressing of stretched pulses by launching the stretched laser pulse into the chirped Bragg grating from an opposite direction.

9. The method of claim 8, further comprising the step of: using a third mirror to provide multipass diffraction of the spectral components of the pulse before retroreflecting to decrease of the delay time between spectral components.

10. The method of claim 9 further comprising the step of: using a prism or a fourth mirror for compensation of the lateral shift to provide reciprocity in a diffracted beam without retroreflection.

* * * * *